(No Model.)
H. F. LONGWORTH, Jr.
STALK FODDER HARVESTER.
No. 404,044. Patented May 28, 1889.
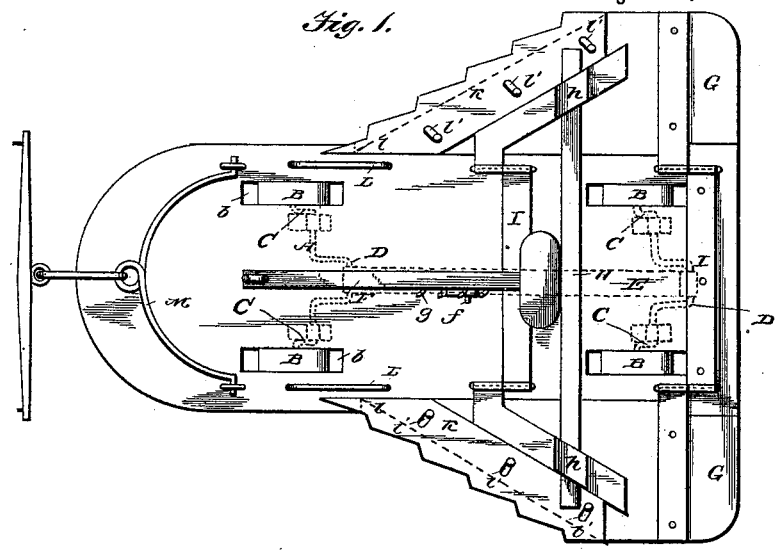
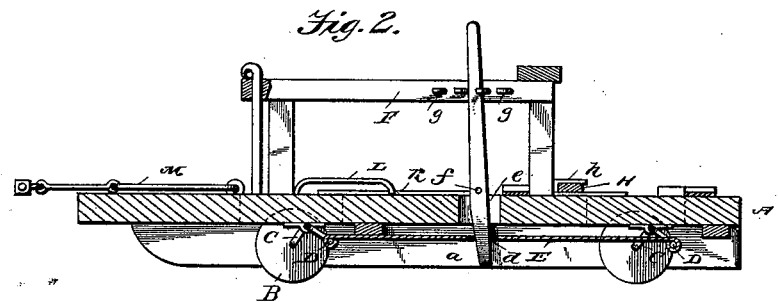
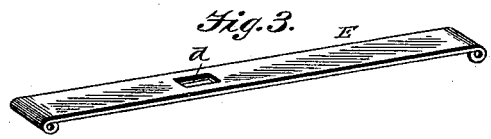
Witnesses:
Inventor:
H. F. Longworth Jr.
By James J. Sheehy
Attorney.

UNITED STATES PATENT OFFICE.

HENDERSON F. LONGWORTH, JR., OF BELOIT, KANSAS.

STALK-FODDER HARVESTER.

SPECIFICATION forming part of Letters Patent No. 404,044, dated May 28, 1889.

Application filed October 8, 1888. Serial No. 287,466. (No model.)

*To all whom it may concern:*

Be it known that I, HENDERSON F. LONGWORTH, Jr., a citizen of the United States, residing at Beloit, in the county of Mitchell and State of Kansas, have invented certain new and useful Improvements in Stalk-Fodder Harvesters; and I do declare the following to be a full, clear, and exact description of the invention, such as will enable others skilled in the art to which it appertains to make and use the same.

My invention relates to stalk-fodder harvesters, and the novelty will be fully understood from the following description and claims, taken in connection with the annexed drawings, in which.

Figure 1 is a plan view of a stalk-harvester constructed according to my invention. Fig. 2 is a longitudinal sectional view of the same; and Fig. 3 is a perspective view of the bar connecting the front and rear crank-axles to manipulate the same.

Referring by letter to the said drawings, A indicates the main frame, which is in outline of approximately the form of a sled, being provided on its under side with runners $a$, and furthermore provided near opposite ends with vertical elongated slots $b$, for the admission of the supporting rollers or wheels, as will be presently described.

B indicates the rollers or wheels for supporting the main frame. These wheels are respectively arranged in the slots $b$ of the frame and journaled on opposite ends of the crank-axles C. It should be observed that these axles, in addition to having their ends cranked to receive the rollers or wheels B, have cranks D about midway of their length for the attachment of a connecting-bar, E, whereby the rollers or wheels which are journaled on the ends of the axles may be raised above the lower edges of the runners $a$, or adjusted to any suitable point below them, thereby adjusting the main frame for cutting the stalks at the desired elevation or altitude, the axles being journaled in suitable bearings on the under side of the frame A. This connecting-bar E is furthermore provided at a suitable point with a slot, $d$, designed to receive the lower end of a hand-lever, which passes through a slot, $e$, in the main frame, and is pivoted to the said frame, as shown at $f$. It will thus be seen that by manipulating this hand-lever the wheels may be raised or depressed with respect to the main frame.

Arranged upon the main frame is a longitudinal frame, F, which is provided at a point above the slot $e$ of the main frame with a series of lugs or hooks, $g$, which are adapted to receive the hand-lever when brought in engagement therewith. By this means it will be seen that the hand-lever may be brought to engage any one of the hooks or lugs $g$, and thereby raise or lower the frame according to the altitude at which the stalks are to be cut. At the end of this frame F is arranged a suitable seat for the driver, and at the forward end of this frame is a rod for holding the lines of the draft-animal.

G indicates wings, there being one hinged to each longitudinal side of the main frame A, so that they may fold thereon, and these wings are provided on their upper sides with keepers $h$, which are designed to receive the transverse lock-bar H, which crosses the main frame and serves as a means of holding the wings which carry cutters down in a horizontal or working position. In hinging these wings to the main frame the pintles may be fixed to the ends of the metallic straps I, and the longitudinal edges of the said frame have shoulders $l$, as shown in dotted lines, Fig. 1, so that when it is desirable to remove the wings from the frame A after the keeper-bar has been taken off it is simply necessary to lift the outer ends of the wings until their forward reduced ends are raised away from the shoulder or abutment $l$, when they may be drawn forwardly off of the pintles, the said shoulder serving as a lock for the hinges when in use. The forward ends of the wings are beveled or cut obliquely, as shown, and on these oblique portions I arrange cutters or blades K, which are here shown as having an approximately saw-edge, and the cutters are furthermore provided with slots $l'$, whereby they may be adjusted upon the wings through the medium of bolts or the like.

L indicates guards arranged on the upper side of the main frame, so as to protect the attendant from the cutters, and M indicates a bail, to which the whiffletree or other draft-attaching device may be applied.

From the construction illustrated it will be seen that by depressing the wheels or rollers sufficiently the stalks, after being cut, may be piled upon the frame, when the machine will serve as a convenient means for transporting them to any suitable point, the wheels thereby serving the twofold function of truck-wheels and wheels for adjusting the frame to cut stalks of various heights.

Having described my invention, what I claim is—

1. The combination, in a cornstalk-harvester having a vertically-adjustable sled-runner frame, of the hinged detachable wings, the cutting-blades adjustably applied to the hinged detachable wings, the side guards, L, the keepers $h$, and a locking-bar, H, substantially as specified.

2. The combination, in a cornstalk-harvester having a sled-runner frame with slots $b$ vertically through it, of the hinged detachable wings, the cutting-blades adjustably applied to the wings, the side guards, L, the keepers $h$, the locking-bar H, the double-cranked axles journaled beneath the frame, wheels applied on said axles and adapted to move in the slots of the frame, the bar E, having a slot, $d$, and connecting the front and rear axles at their cranked portions, the hand-lever loosely entering the slot in the connecting-bar and pivoted to the main frame, the raised frame F, and engaging devices for the lever arranged on said frame F, substantially as specified.

In testimony whereof I affix my signature in presence of two witnesses.

HENDERSON F. LONGWORTH, JR.

Witnesses:
C. P. STEVENS,
MERRIT TERRELL.